(12) United States Patent (10) Patent No.: US 7,484,272 B1
Raevis et al. (45) Date of Patent: Feb. 3, 2009

(54) ATTACHABLE LATCH/LIFT EYE

(75) Inventors: Joseph J. Raevis, Fair Haven, NJ (US); Charles A. Domino, Toms River, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 510 days.

(21) Appl. No.: 11/444,815

(22) Filed: May 26, 2006

(51) Int. Cl.
*B25G 3/32* (2006.01)
(52) U.S. Cl. ........................................ 16/428; 24/115 R
(58) Field of Classification Search ................... 16/428, 16/422; 24/115 R, 115 A, 136 R, 129 R, 24/130, 129 W; 403/212, 291; 57/202; 254/DIG. 14; 182/5
See application file for complete search history.

(56) References Cited

U.S. PATENT DOCUMENTS

| | | | |
|---|---|---|---|
| 2,869,906 A | * | 1/1959 | Person ........................ 403/212 |
| 2,895,195 A | * | 7/1959 | Ehmann ...................... 403/212 |
| 3,008,208 A | * | 11/1961 | Stephan ....................... 403/212 |
| 3,032,846 A | * | 5/1962 | Stanton et al. .............. 403/212 |
| 3,067,570 A | * | 12/1962 | Nischan ........................ 57/202 |
| 4,000,557 A | | 1/1977 | Bawden et al. |
| 4,529,240 A | * | 7/1985 | Engel .......................... 294/141 |
| 5,113,551 A | | 5/1992 | Roberts |
| 6,712,181 B2 | | 3/2004 | Nichols |
| 6,971,615 B1 | | 12/2005 | Diggle, III et al. |

* cited by examiner

*Primary Examiner*—William L. Miller
(74) *Attorney, Agent, or Firm*—Fredric J. Zimmerman

(57) ABSTRACT

An attachable handle for a rope including a rope attachment portion with a duct passing through the attachment portion. The duct holds the handle to the rope and the duct includes a first end having a first diameter to permit passage of a length of rope and a collar around the length of rope through the first end of the duct. A collar diameter is greater than the rope diameter. The duct also includes a second end opposite the first end with a second diameter larger than the rope diameter but smaller than the collar diameter. The second end permits passage of the rope through the second end but prevent passage of the length of rope containing the collar. At least one slot is provided running along at least a portion of a length of the duct. A handle portion extends from the rope attachment portion.

20 Claims, 3 Drawing Sheets

ATTACHABLE LATCH/LIFT EYE

STATEMENT OF GOVERNMENT INTEREST

The invention described herein may be manufactured and used for the Government of the United States of America for governmental purposes without payment of any royalties thereon or therefore.

FIELD OF THE INVENTION

The present invention is directed to attachable and removable handles, latches or lift eyes for wire ropes.

BACKGROUND OF THE INVENTION

Wire rope is constructed from a number of wires twisted together to form a strand. Groups of these strands are twisted together helically and symmetrically to form a rope made of wire. The stranded construction of wire rope produces greater strength and flexibility for a given aggregate cross-sectional area over a single bar of metal or steel having the same cross-sectional area. This combination of increased strength, i.e. tensile strength, and flexibility makes wire rope a popular choice for use in hauling, lifting or moving freight.

Hauling or lifting objects using wire rope requires attachment of a lifting device such as a crane or a come-along to a length of wire rope. In many applications, attachment is facilitated by forming a loop in the wire rope and splicing the wire rope to close the loop. However, the wire rope is only as strong as its weakest link, i.e. the spliced area on the wire rope. In addition, forces applied laterally to the wire rope either in the loop or along the length of the wire rope are not as desirable as tensile forces applied along the axis of the wire rope. This characteristic exists because the wire rope possesses its greatest strength in tension, not in compression or in response to lateral forces.

Therefore, loops or latches have been developed that fit along the length of the wire rope and provide for attachment in a manner that applies most forces in tension along the axis of the wire rope. These loops or latches are attached along the length of wire rope and grip one of a group of swaged collars that are spaced along the length of the wire rope. Conventional latches are rather complex devices containing multiple moving parts that are assembled together to form the latch. Manufacture of these latches requires the production of multiple parts, high tolerance forming operations, heat treating and typically cleaning and plating steps to ensure proper operation of the latches in hauling environments.

Therefore, the need exists for a loop or latch that can be attached to a wire rope to provide a point of attachment for hauling or pulling and that is constructed from a single piece of material.

SUMMARY OF THE INVENTION

The present invention is directed to attachable handles for use with wire ropes containing collars or swages. In general, the collar diameters are greater than the wire rope diameters. The attachable handle includes a wire rope attachment portion and a handle portion extending from the wire rope attachment portion. The wire rope attachment portion and the handle portion may form a unitary structure. The attachment portion is arranged to provide attachment to the wire rope collar or swage and to transfer pulling and lifting forces as tensile forces along the length of the wire rope. The handle portion is arranged for example as a loop to provide for gripping or attachment of a lifting device.

The wire rope attachment portion includes a generally cylindrical duct that has a first end and a second end opposite the first end. The first end has a first diameter that is larger than both the diameter of the wire rope and the diameter of collars disposed around lengths of the wire rope. This size configuration permits passage of the lengths of wire rope containing the collars through the first end of the duct. The second end has a second diameter larger than the wire rope diameter but smaller than the collar diameter. This sizing permits passage of the wire rope through the second end but prevents passage of the length of wire rope containing the collar through the second end. Therefore, the duct is arranged to grip or hold the collars disposed on the wire rope.

At least one slot is provided in the wire rope attachment portion running along at least a portion of the length of the duct. This slot has a width larger than the wire rope diameter but less than the collar diameter. The slot can be provided running along the entire length of the duct to provide attachment to the wire rope without having to thread the wire rope through the duct. In addition to having just a single slot, the wire rope attachment portion can include two slots both in communication with the duct. The two slots include a first slot as described above and a second slot running along at least a portion of the length of the duct opposite the first slot so that the first slot and the second slot are substantially parallel to each other. Both the first and second slot only run along a portion of the length of the duct, and the second slot has a width larger than the diameter of the collar. The first slot extends from the second end of the duct along the portion of the length of the duct, and the second slot extends from the first end of the duct along a portion of the length of the duct. Although having a width smaller than the diameter of the collars running along lengths of the wire rope, the first slot also includes an enlarged area disposed between the first and second ends of the duct and having a size sufficient to accommodate passage of the collar.

DETAILED DESCRIPTION OF EXEMPLARY EMBODIMENTS OF THE INVENTION

Figure 1:
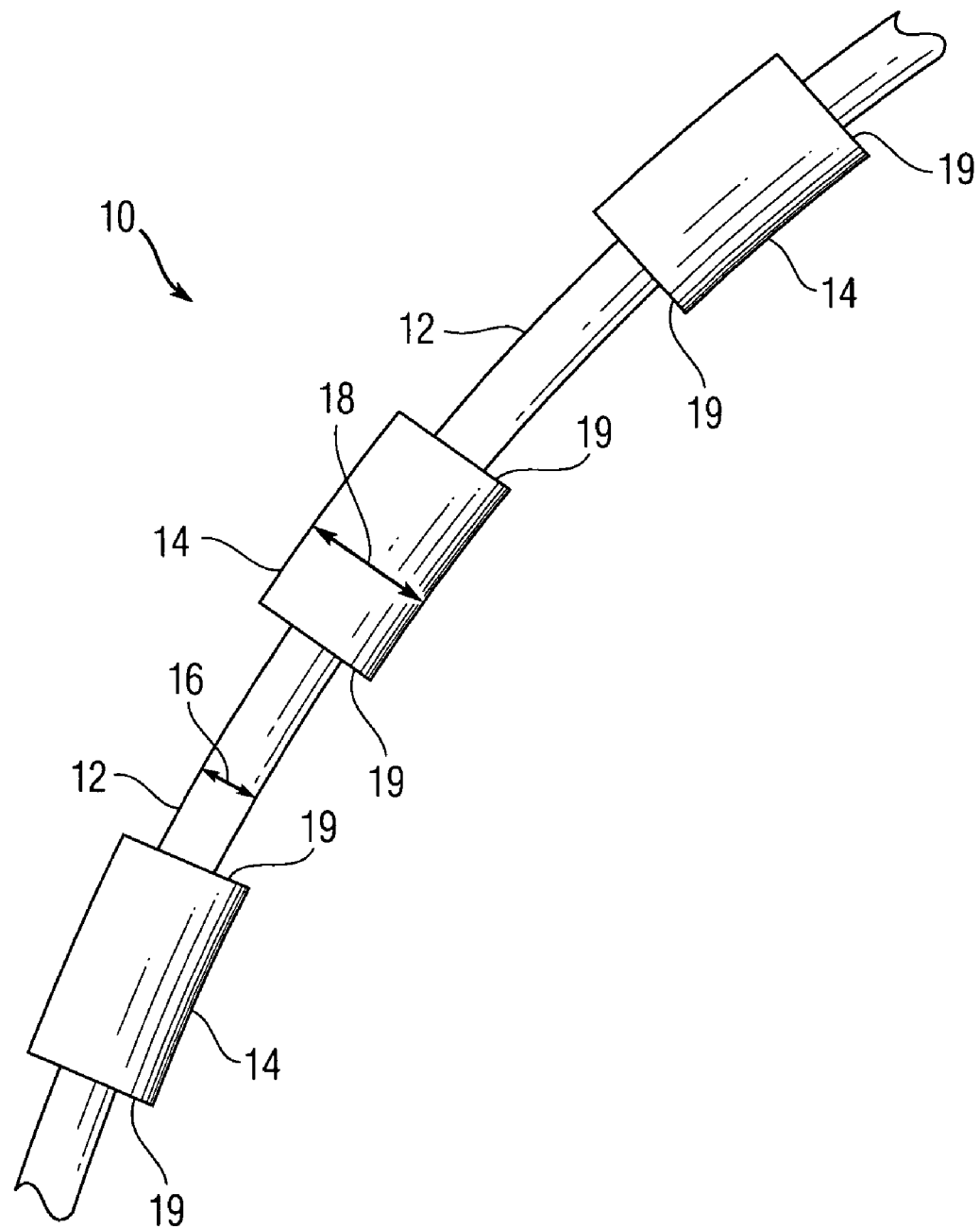
FIG. 1 is side view of an embodiment of a section of wire rope with swage collars for use with embodiments of attachable handles of the present invention.

Referring initially to FIG. 1, an embodiment of a wire rope assembly 10 for use with embodiments of the attachable handles of the present invention is illustrated. The wire rope assembly 10 includes a central wire rope 12 and a plurality of collars 14 disposed along lengths of the central wire rope 12. The wire rope 12 can be constructed of any suitable material including metal according to methods well know and available in the art. In an embodiment, the wire rope 12 includes a plurality of wire strands. The wire rope can have any suitable shape or cross-section. In an embodiment, the wire rope includes a generally circular cross-section having a diameter 16 that provides suitable strength for the lifting or hauling applications for which the wire rope assembly is used. The plurality of collars 14 are spaced along lengths of the wire rope and are fixedly attached thereto. Suitable materials for the collars may include plastics, polymers and metals. Suitable methods for attaching each collar to the wire rope may include gluing, heat bonding, attaching using fasteners, using a swage and combinations thereof. In an embodiment, for example, each collar is a metal swage collar. These collars do not move along the length of the wire rope. The collars can be any suitable shape. In particular, each collar may be generally cylindrical in shape and placed around the wire rope in a concentric alignment with the wire rope. Each collar has a predefined diameter 18 that is larger than the diameter 16 of the wire rope. Therefore, the collars 14 and, in particular, the edges of the collars 19 provide points to grip the wire rope assembly and to apply force to the wire rope assembly for purposes such as lifting and hauling.

Figure 2:
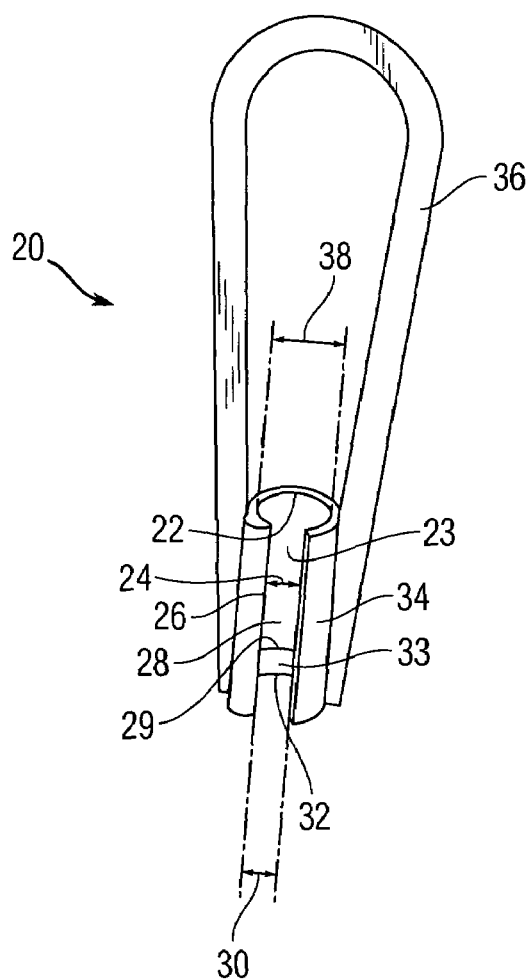
FIG. 2 is a perspective view from one side of an embodiment of an attachable handle in accordance with the present invention.

Referring to FIG. 2, an exemplary embodiment of an attachable handle 20 for a wire rope 12 includes a collar 14 in accordance with the present invention as illustrated. The attachable handle 20 is capable of being attached to and removed from the wire rope 12 and provides a hook, lift eye or latching point (not shown) for gripping the wire rope or for attaching equipment such as cranes or hoists to the wire rope. The attachable handle 20 can be attached to the wire rope laterally or can be threaded over an end of the wire rope.

In an embodiment, the attachable handle 20 includes a wire rope attachment portion 34. The wire rope attachment portion 34 is arranged to provide for secure and releasable attachment of the handle to the wire rope. In an embodiment, the wire rope attachment portion 34 includes at least one generally cylindrical tubular passage or duct 28 passing through at least a portion of the attachment portion 34. The attachment portion can be any desired shape and can have a circular, rectangular or other suitable cross section. In an embodiment, the attachment portion 34 is generally cylindrical, and the duct forms a central, concentric shaft running through the attachment portion 34. The size and thickness of the attachment portion are selected based upon the size of the wire rope to which the handle is to be attached and the hauling or carrying loads to which the handle is to be subjected. Sizing of the attachment portion in accordance with these factors is accomplished through methods known and available in the art.

In an embodiment, the duct 28 includes a first end 22, or opening, sized to accept and to permit passage of both the wire rope 12 and the collar 14. In an embodiment, the first end 22 includes a first diameter 38, which is larger than the diameter of the wire rope 12 and the diameter of the collar 14 that is disposed around a length of the wire rope. This configuration permits passage of the length of wire rope 12 containing the collar 14 through the first end of the duct 28. The duct 28 also includes a second end 32, or opening, opposite the first end 22. The second end 32 is sized to permit passage of the wire rope 12 only and to prevent passage of the length of wire rope containing the collar. In an embodiment, the second end 32 includes a second diameter 30, which is larger than the wire rope diameter 16 but smaller than the collar diameter 18 to permit passage of the wire rope through the second end 32 and to prevent passage of the length of wire rope containing the collar through the second end 32. Since the collar diameter 18 is greater than the wire rope diameter 16, when the wire rope is passed through the duct 28, the collar 14 will enter the first end 22 and advance down the duct 28. However, since the second end 32 is sized to prevent passage of the collar, the collar 14 will stop within the duct 28. This configuration provides attachment of the handle 20 to the wire rope 12. The handle 20 is releasable, because the collar can be pulled from the duct in the direction of the first end.

Figure 3:
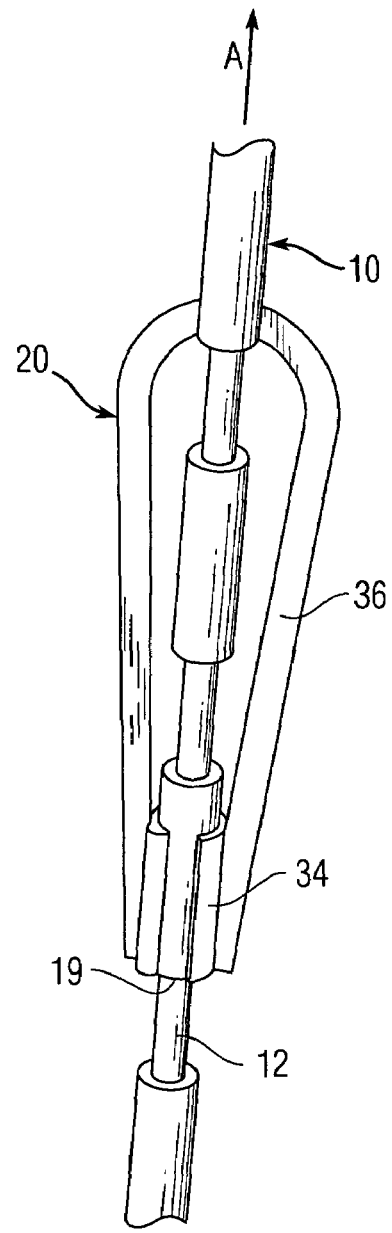
FIG. 3 is the front perspective view of FIG. 2 attached to a wire rope with collars.

In an embodiment as illustrated, the duct 28 includes two distinct regions. A first region 23 is disposed adjacent the first end 22 where the first region 23 includes the first end diameter 38. A second region 33 is disposed adjacent the second end 32 where the second region, including the second end 32, includes a second end diameter 30. The transition from the first region to the second region creates a ledge or lip 29 protruding into the duct 28. As shown in FIG. 3, this ledge 29 engages one of the edges 19 of one of the collars 14 to provide attachment and to transfer any forces applied to the handle to the wire rope. These forces including pulling forces applied in the direction indicated by arrow A. Forces in this direction are directed along the length of the wire rope and assist in maintaining the collar within the duct. Accordingly, the first diameter 38 and the second diameter 30 are both internal diameters where the first diameter 38 is larger than the second diameter 30 so that the first diameter 38 and the second diameter 30 form a stepped internal diameter configuration.

In order to facilitate attachment of the handle 20 to the wire rope 12 without threading the wire rope 12 through an end of the duct, in an embodiment, the wire rope attachment portion 34 includes a slot 26 running along at least a portion of a length of the duct 28. The slot 26 includes a width 24 larger than the wire rope diameter 16 but smaller than the collar diameter 18. Therefore, the wire rope 12 is passed through the slot 26 and into the duct 28 with one of the collars disposed adjacent the first end of the duct. The collar can be advanced into the duct to a position as illustrated in FIG. 3, securing the attachable handle to the wire rope.

Figure 4:
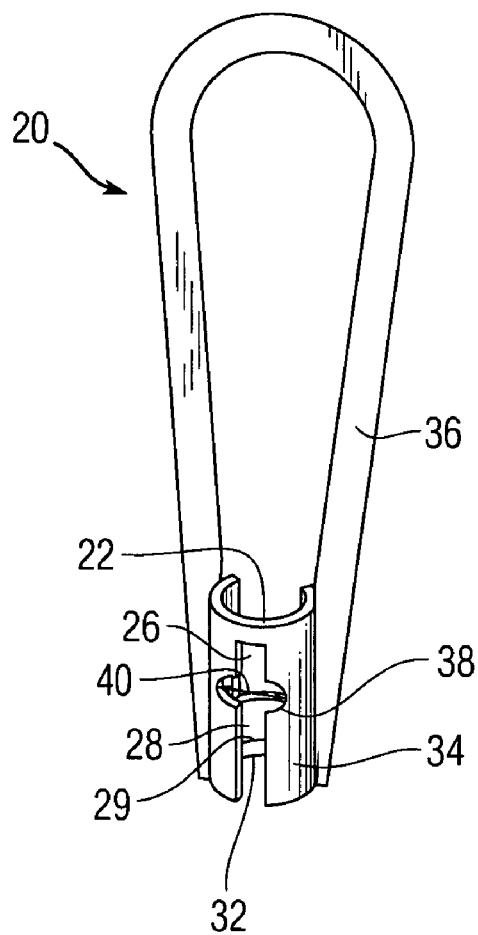
FIG. 4 is a perspective view from one side of another embodiment of an attachable handle in accordance with the present invention.
Figure 5:
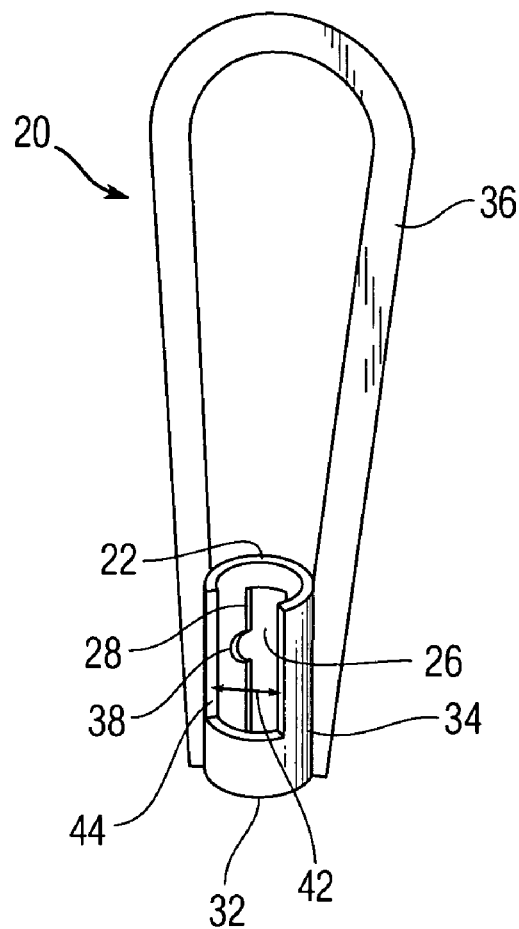
FIG. 5 is a perspective view from a side opposite the view of the embodiment of FIG. 4.

In an embodiment, the slot 26 extends along an entire length of the duct 28 from the first end 22 to the second end 32 to allow insertion of the wire rope into the duct through the slot while preventing passage of the length of wire rope containing the collar through the slot. In another embodiment as is illustrated in FIGS. 4 and 5, the slot 26 does not run the entire length of the duct but only along a portion of the duct. In an embodiment, the slot 26 is a first slot running from the second end 32 along a portion of the length of the duct 28 and terminating short of the first end 22. In this embodiment, the wire rope attachment portion 34 also includes a second slot 44 running along at least a portion of the length of the duct on a side of the duct opposite the first slot 26 and, in particular, the first slot 26 is substantially parallel to the second slot 44. In an embodiment, the second slot 44 includes a width 42 larger than the diameter 18 of the collar. Therefore, collar 14 can be passed through the second slot. In an embodiment, the second slot 44 runs from the first end 22 along a portion of the length of the duct 28, terminating short of the second end 32. In an embodiment, the first slot 26 includes an enlarged area 38 disposed between the first and second ends of the duct where the first slot 26 may be of a size sufficient to accommodate passage of the collar. In an embodiment, the enlarged area 38 is a circle including a diameter 40 larger then the collar diameter 18. Therefore, the wire rope is inserted into the handle by passing the wire rope through the enlarged area 38 of the first slot until the trailing edge of a collar passes through the enlarge area 38. The wire rope is pivoted or rotated until the wire rope and collar move into a generally parallel or concentric relationship with the duct. The collar is advanced through the duct in the direction of the second end, and the attachable handle is attached to the wire rope.

As illustrated in FIGS. 2-5, the attachable handle 20 also includes a handle portion 36 extending from the wire rope attachment portion 34. In an embodiment, the wire rope attachment portion 34 and the handle portion 36 may be constructed as a unitary structure. In particular, the handle portion 36 and the wire rope attachment portion 34 may be constructed as a single unit, for example, a single molded unit. In an alternate embodiment, the handle portion 36 is fixedly attached to the wire rope attachment portion 34 using welds or adhesives. The handle portion can attach to and extend from the wire rope attachment portion in any suitable direction to facilitate pulling, lifting or hauling. In an embodiment, the handle portion 36 may extend from a side of the wire rope attachment portion, which includes the first end of the duct, to the other side of the wire rope attachment portion 34. Therefore, upon application of a pulling force to the handle portion 36 in the direction of arrow A, the forces direct the collar into the duct and maintain the attachment of the handle to the wire rope. In addition, the handle portion 36 and wire rope attachment portion 34 are arranged so that the resultant force on the wire rope in the direction of arrow A resulting from pulling on the attachable handle 20 is mostly a tensile force on the wire rope. In an embodiment, the attachable handle 20 when attached to the wire rope produces a substantially concentric alignment between the duct 28 and the wire rope 12. In an embodiment, when the handle is attached to the wire rope, the handle portion 36 is disposed as close to the wire rope as possible and, in particular, may be in contact with the wire rope to align the pulling forces as tensile forces along the wire rope.

Suitable shapes for the handle portion 36 include, but are not limited to, bars, hooks, eyes or latches. In an embodiment, the handle portion 36 includes the shape of a loop, i.e., a closed loop.

The attachable handle 20 can be constructed of any material that is capable of supporting the forces applied to the handle during use. Suitable materials include, without limitation, metals, plastics, polymers, ceramics and combinations thereof. In an embodiment, the attachable handle is made from a metal material.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An attachable handle for a wire rope including a collar, comprising:
    a wire rope attachment portion comprising a generally cylindrical duct passing through the wire rope attachment portion, the duct comprising a first end and a second end, the first end is comprised of a
        first diameter larger than a diameter of a wire rope and the diameter of a collar being disposed around a length of the wire rope to permit passage of the length of wire rope through the first end of the duct, the collar diameter is greater than the wire rope diameter; and
        the second end opposite the first end, the second end is comprising a second diameter larger than the wire rope diameter but smaller than the collar diameter to permit passage of the wire rope through the second end and to prevent passage of the length of wire rope containing the collar through the second end;
    a slot running along at least a portion of a length of the duct, the slot is comprised of a width larger than the wire rope diameter but less than the collar diameter; and
    a handle portion extending from the wire rope attachment portion,
        wherein the wire rope attachment portion and the slot are configured to adjustably receive the wire rope.

2. The attachable handle of claim 1, wherein the slot extends along an entire length of the duct from the first end to the second end to allow insertion of the wire rope into the duct through the slot while preventing passage of the length of wire rope containing the collar through the slot.

3. The attachable handle of claim 1, wherein a substantially concentric alignment exists between the duct and the wire rope when the attachable handle is attached to the wire rope.

4. The attachable handle of claim 1, wherein the handle portion extends from a side of the wire rope attachment portion comprising the first end of the duct.

5. The attachable handle of claim 1, wherein the handle portion further comprises a loop.

6. The attachable handle of claim 1, wherein the slot running along at least a portion of the duct comprises a first slot, and
    wherein the wire rope attachment portion further comprises a second slot running along at least a portion of the length of the duct opposite the first slot, the second slot comprises a width larger than the diameter of the collar.

7. The attachable handle of claim 6, wherein the first slot extends from the second end of the duct along the portion of the length of the duct, and
    wherein the second slot extends from the first end of the duct along a portion of the length of the duct.

8. The attachable handle of claim 6, wherein the first slot comprises an enlarged area disposed between the first end and the second end of the duct, the first slot includes a size sufficient to accommodate passage of the collar.

9. The attachable handle of claim 6, wherein the first slot comprises an enlarged area disposed between the first end and the second end of the duct, and
    wherein the enlarged area comprises a circle including a diameter larger than the collar diameter.

10. The attachable handle of claim 1, wherein the attachable handle is comprised of a metal material.

11. An attachable handle for a wire rope including a collar, comprising:
    a wire rope attachment portion comprising a duct passing through the wire rope attachment portion, the duct comprising a first end and a second end, the first end is comprised of a
        first diameter larger than a diameter of the wire rope and a diameter of the collar disposed around a length of the wire rope to permit passage of the length of wire rope through the first end of the duct, the collar diameter is greater than the wire rope diameter; and
        the second end opposite the first end, the second end is comprised of a second diameter larger than the wire rope diameter but smaller than the collar diameter, the second end permits passage of the wire rope through the second end and prevents passage of the length of wire rope containing the collar through the second end;
a first slot running along at least a portion of a length of the duct, the slot is comprised of a width larger than the wire rope diameter but less than the collar diameter;
a second slot running along at least a portion of the length of the duct opposite the first slot, the second slot is comprised of a width larger than the collar diameter; and
a handle portion extending from the wire rope attachment portion,
wherein the duct is a generally cylindrical shaped duct.

12. The attachable handle of claim 11, wherein the wire rope attachment portion and the handle portion comprise a unitary structure.

13. The attachable handle of claim 11, wherein the handle portion further comprises a loop.

14. The attachable handle of claim 11, wherein the first slot extends from the second end of the duct along the portion of the length of the duct and the second slot extends from the first end of the duct along a portion of the length of the duct.

15. The attachable handle of claim 11, wherein the first slot comprises an enlarged area disposed between the first end and the second end of the duct, the first slot includes a size sufficient to accommodate passage of the collar.

16. The attachable handle of claim 15, wherein the enlarged area comprises a circle including a diameter larger then the collar diameter.

17. The attachable handle of claim 11, wherein the first slot and the second slot are substantially parallel to each other.

18. The attachable handle of claim 11, wherein a substantially concentric alignment exists between the duct and the wire rope when the attachable handle is attached to the wire rope.

19. The attachable handle of claim 11, wherein the handle portion extends from a side of the wire rope attachment portion at the first end.

20. An attachable latch for a rope, comprising:
a rope attachment portion comprising a duct passing through the attachment portion,
the duct is comprised of a first end and a second end, the first end is comprised of a first diameter larger than a diameter of the rope and a diameter of a collar disposed around a length of the rope, where the first end permits passage of the length of the rope through the first end of the duct and the collar diameter is greater than the rope diameter; and
the second end is opposite the first end where the second end comprises a second diameter larger than the rope diameter but smaller than the collar diameter;
at least one slot running along at least a portion of a length of the duct, said at least one slot is comprised of a width larger than the diameter of the rope but less than the collar diameter; and
a handle portion extending from the rope attachment portion,
wherein the rope attachment portion and said at least one slot are configured to adjustably receive the rope.

* * * * *